US010735528B1

(12) United States Patent
Shafiullah (10) Patent No.: US 10,735,528 B1
(45) Date of Patent: Aug. 4, 2020

(54) GEOGRAPHIC RELOCATION OF CONTENT SOURCE IN A CONTENT DELIVERY NETWORK

(71) Applicant: Amazon Technologies, Inc., Seattle, WA (US)

(72) Inventor: Mohammad Shafiullah, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

(21) Appl. No.: 14/967,789

(22) Filed: Dec. 14, 2015

(51) Int. Cl.
*H04L 29/08* (2006.01)
*H04L 29/06* (2006.01)

(52) U.S. Cl.
CPC ........ *H04L 67/148* (2013.01); *H04L 65/1066* (2013.01); *H04L 67/22* (2013.01); *H04L 67/36* (2013.01)

(58) Field of Classification Search
CPC ... H04L 67/148; H04L 65/1066; H04L 67/22; H04L 67/36
USPC ........................................................ 709/219
See application file for complete search history.

(56) References Cited

U.S. PATENT DOCUMENTS

| | | | | |
|---|---|---|---|---|
| 7,136,922 | B2* | 11/2006 | Sundaram | H04L 29/12132 709/217 |
| 7,818,454 | B2* | 10/2010 | Kim | H04L 29/12066 709/214 |
| 8,176,018 | B1* | 5/2012 | Bisson | G06F 17/30144 707/690 |
| 2003/0204602 | A1* | 10/2003 | Hudson | D01D 5/423 709/228 |
| 2006/0218304 | A1* | 9/2006 | Mukherjee | G06F 16/9574 709/246 |
| 2012/0303804 | A1* | 11/2012 | Sundaram | H04L 29/12132 709/224 |
| 2015/0127844 | A1* | 5/2015 | Phillips | H04L 65/601 709/231 |
| 2016/0127440 | A1* | 5/2016 | Gordon | H04N 21/23439 709/219 |

OTHER PUBLICATIONS

Nicholas C. Zakas, "How content delivery networks(CDNs) work", Nov. 29, 2011, https://www.nczonline.,net/blog/2011/11/29/how-content-delivery-networks-cdns-work.*

* cited by examiner

*Primary Examiner* — Umar Cheema
*Assistant Examiner* — John Fan
(74) *Attorney, Agent, or Firm* — Klarquist Sparkman, LLP (57) ABSTRACT

A Content Delivery Network (CDN) service provider is described that monitors historical data of a geographic distribution of requests and makes source relocation recommendations based on the historical data. Based on a selected recommendation, the CDN service provider can migrate the source of content from a first geographical region to a second geographical region closer to where the requests are generated. As a result, a round-trip time (RTT) for requests is reduced, even for first time requests.

18 Claims, 8 Drawing Sheets

GEOGRAPHIC RELOCATION OF CONTENT SOURCE IN A CONTENT DELIVERY NETWORK

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices that can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider provides client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can cache/maintain content from various content providers. The term POP (Point-of-Presence) or edge locations are used to identify location-based clusters of computing devices in a communication network. In turn, content providers can instruct, or otherwise suggest to, client computing devices to request some, or all, of the content provider's content from the CDN service provider's computing devices. In this context, the original content provider (where the actual original data is located) becomes the "Origin" of the content.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content, as well as caching-related attributes (e.g., cache-control max-age HTTP response header) of requested content in order to meet service level agreements or to generally improve the quality of delivery service. The CDN takes advantage of DNS to route the request to a specific edge location. In a typical scenario, a client/browser issues a DNS query that reaches the CDN Domain Servers. The servers analyze the source of the request and respond back with a set of IP addresses belonging to one edge location/POP. Once the client/browser receives the DNS response, it communicates with one of the IPs to request the object. Finally, once the POP web server (that has the specified IP assigned) receives the request, it issues a new request to the "Origin" webserver, if the content is not already located in the edge location/POP cache, and caches the content at the edge location/POP and serves the content back to the Client/browser. It is the DNS infrastructure of the CDN that decides what POP should be used for the request. Moreover, there are at least three latencies that are pertinent: DNS query related latency; latency between Client/browser and CDN POP; and latency between CDN POP and the origin. Reduction of latency can further be considered for a first-time request for content and subsequent requests for content. Caching solutions have been used for subsequent requests of content, but few, if any, latency schemes address first-time request latency.

DETAILED DESCRIPTION

A Content Delivery Network (CDN) service provider is described that monitors historical data of a geographic distribution of requests and makes source (e.g., origin) relocation recommendations based on the historical data. Historical data can be derived from DNS/web request related logs from the CDN DNS/web servers that capture when and where the web requests came from and what POP locations the requests landed on. A customer can select one of the recommendations and, based on a selected recommendation, the CDN service provider can migrate the source of content from a first geographical region to a second geographical region closer to where the majority of the requests are generated. As a result, a round-trip time (RTT) for requests is reduced, even for first time requests where no cache exists yet. In one example, the CDN service provider can use the historical data to determine which edge locations (within the CDN) most requests are being routed to. In other embodiments, the CDN service provider can use other parameters, such as availability of resources or speed of resources to determine an optimal edge location near which an origin server computer can be moved. A source of content can then be migrated near the determined edge location(s). The historical data can be obtained through parsing of CDN log data files to determine any of a plurality of parameters including where the request was generated, an IP address associated with the request, an edge location that the request went through, and a RTT for the request, etc. Based on one or more of these parameters, an optimal location for an origin of source content can be determined so as to make the recommendations and potential migration of the origin server computer. The recommendation can take into consideration a time-series distribution of the requests to make migration recommendations, for example, several times a year. For example, requests can be heavier from one region during a first time period and from a different region during a different time period. Additionally, the recommendation can be based on patterns of the requests. For example, various unsupervised learning (e.g., data clustering algorithms) can be used to find patterns associated with the requests. Example algorithms can be k-means clustering, fuzzy c-means clustering, Gaussian clustering, etc.

Figure 1:
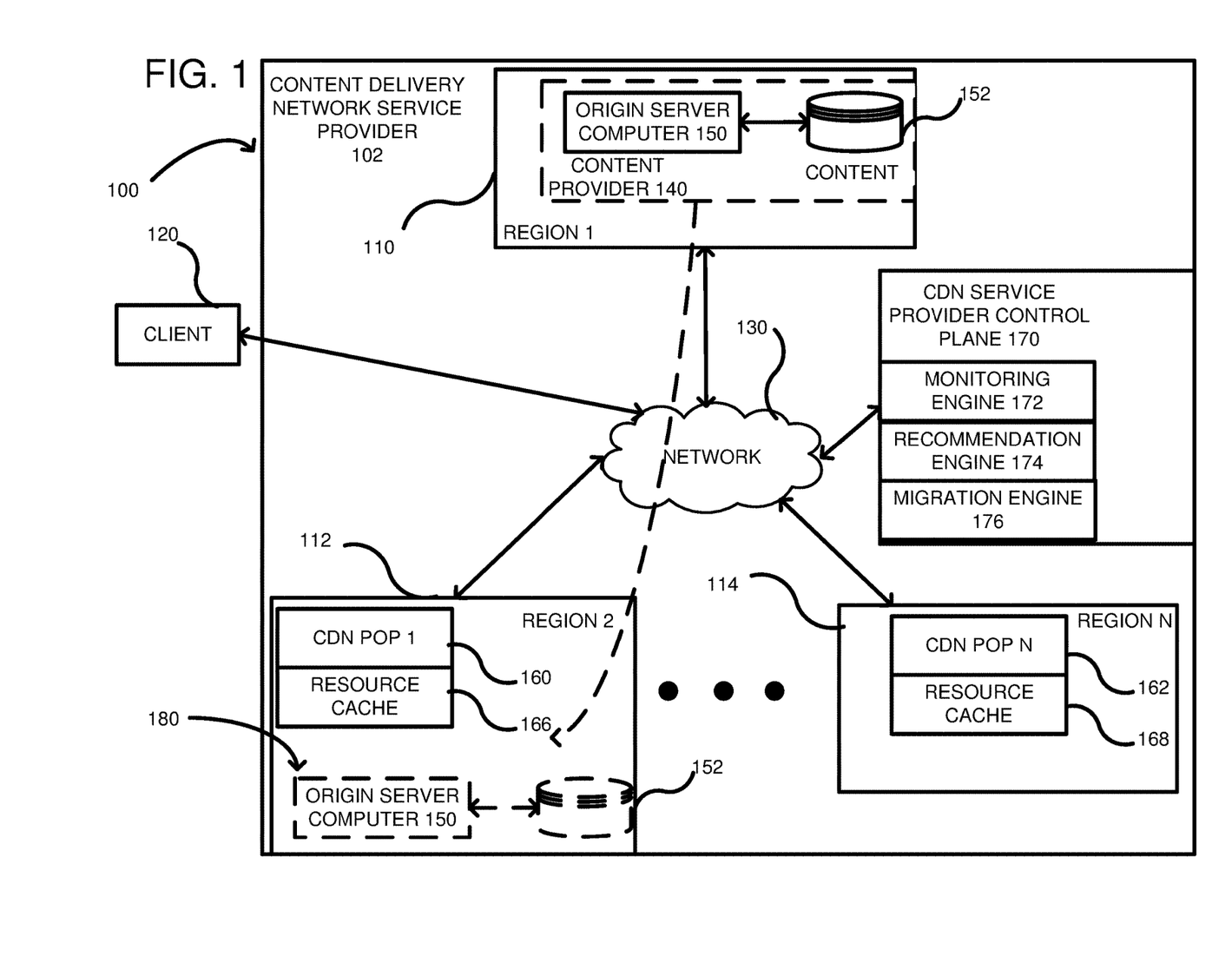
FIG. 1 is an example system diagram of a Content Delivery Network (CDN) wherein an origin server computer content and/or functionality and is migrated from a first region to a second region.

FIG. 1 is an example system diagram of a Content Delivery Network (CDN) environment 100 including a CDN service provider 102, which includes a plurality of regions 110 (region 1), 112 (region 2), 114 (region N, where N is any number). The different regions represent different geographical regions (e.g., different countries or different regions in a country) wherein an origin server computer's content is migrated from the first region 110 to the second region 112, as further described below. The CDN environment 100 is for the management and processing of content requests from client computing devices, such as client computing device 120. The client computing devices request content (e.g., text, images, etc.) from the CDN environment 100. In an illustrative embodiment, the client computing device 120 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing device 120 includes hardware and software components for establishing communications over a communication network 130, such as a wide area network or local area network. For example, the client computing device 120 may be equipped with networking equipment and browser software applications that facilitate communications via the Internet or an intranet.

Although not illustrated in FIG. 1, each client computing device 120 can utilize a local DNS resolver component, such as a DNS Name server, that generates the DNS queries attributed to the client computing device. In one embodiment, the local DNS resolver component may be provided by an enterprise network to which the client computing device 120 belongs. In another embodiment, the local DNS resolver component may be provided by an Internet Service Provider (ISP) that provides the communication network connection to the client computing device 120.

The CDN environment 100 can also include a content provider 140 in communication with the one or more client computing devices 120 via the communication network 130. The content provider 140 illustrated in FIG. 1 corresponds to a logical association of one or more computing devices associated with a content provider. Specifically, the content provider 140 can include a web server component (not shown in FIG. 1) corresponding to one or more server computing devices for obtaining and processing requests for content (such as Web pages) from the client computing devices 120. The content provider 140 can further include an origin server computer 150 and associated storage component 152 corresponding to one or more computing devices for obtaining and processing requests for network resources. One skilled in the relevant art will appreciate that the content provider 140 can be associated with various additional computing resources, such additional computing devices for administration of content and resources, DNS name servers, and the like. For example, although not illustrated in FIG. 1, the content provider 140 can be associated with one or more DNS name server components that would be authoritative to resolve client computing device DNS queries corresponding to a domain of the content provider (i.e., the origin).

The CDN service provider 102 is in communication with the one or more client computing devices 120 and the content providers 140 via the communication network 130. Although the network 130 is shown within the CDN service provider 102, it can also be located outside of the CDN service provider. The CDN service provider 102 illustrated in FIG. 1 corresponds to a logical association of one or more computing devices and can include a number of Point of Presence ("POP") locations 160 and 162 that correspond to nodes on the communication network 130. Any number of POPs can be available in the CDN environment. Each POP 160, 162 includes a resource cache component 166, 168 made up of a number of cache server computing devices for storing resources from content providers and transmitting various requested resources to various client computers. The resource cache components 166, 168 may further include additional software and/or hardware components that facilitate communications including, but not limited, load balancing or load sharing software/hardware components. Each CDN POP and resource cache are considered at least a part of an edge location within a region and are at least some of the edge servers that make up the edge location. Additionally, each region can have one or more edge locations depending on the volume of requests and/or the size of the geographic region.

The CDN service provider 102 can further include a CDN service provider control plane 170, which can include one or more host server computers coupled to the network 130. The host server computers can be used to execute a monitoring engine 172, a recommendation engine 174, and a migration engine 176. The monitoring engine 172 can be used to monitor from where requests are generated, IP addresses associated with the requests, edge locations that the requests went through, and RTT for the requests, etc. Based on one or more of these parameters, an optimal location for an origin of source content can be determined. For example, if a higher percentage of requests originated from region 2 (112), while much fewer requests came from region N (114), then a determination can be made that region 2 is an optimal region to which to move the content 152 and the origin server computer functionality. The recommendation engine 174 can then make one or more recommendations to the content provider 140, wherein the recommendations include candidate regions to which the content 152 can be moved so as to reduce the RTT of requests. The RTT of all requests can be for a majority of requests, and not necessarily all requests. Although not shown in FIG. 1, a display can show a plurality of candidate regions with a percentage of requests associated with each region. A user interface can be used to interactively select the desired region. As a result of the selection, an API request can be sent to a migration engine 176 asking the migration engine 176 to move the content 152 and the origin server computer functionality 150 to the selected region, which in this example is region 2 as shown by arrow 180. The origin server computer 150 and the content 152 are shown in dashed lines indicating that they were moved from region 1 to region 2. By being closer to the source of the requests, the content provider can respond more quickly reducing the overall RTT, even for first-time requests. To migrate the content provider 140 to the new region, one or more server computers in the desired location can be identified and the content can be moved through API requests via the network 130. The new location 180 can then be registered with the CDN service provider 102 so that future requests for the content are directed to the origin server in region 112, rather than region 110. The server computer in region 110 can then be used as backup of the server computer in region 112 or the server computer in region 110 can be used for another purpose altogether unrelated to the content 152.

Figure 2:
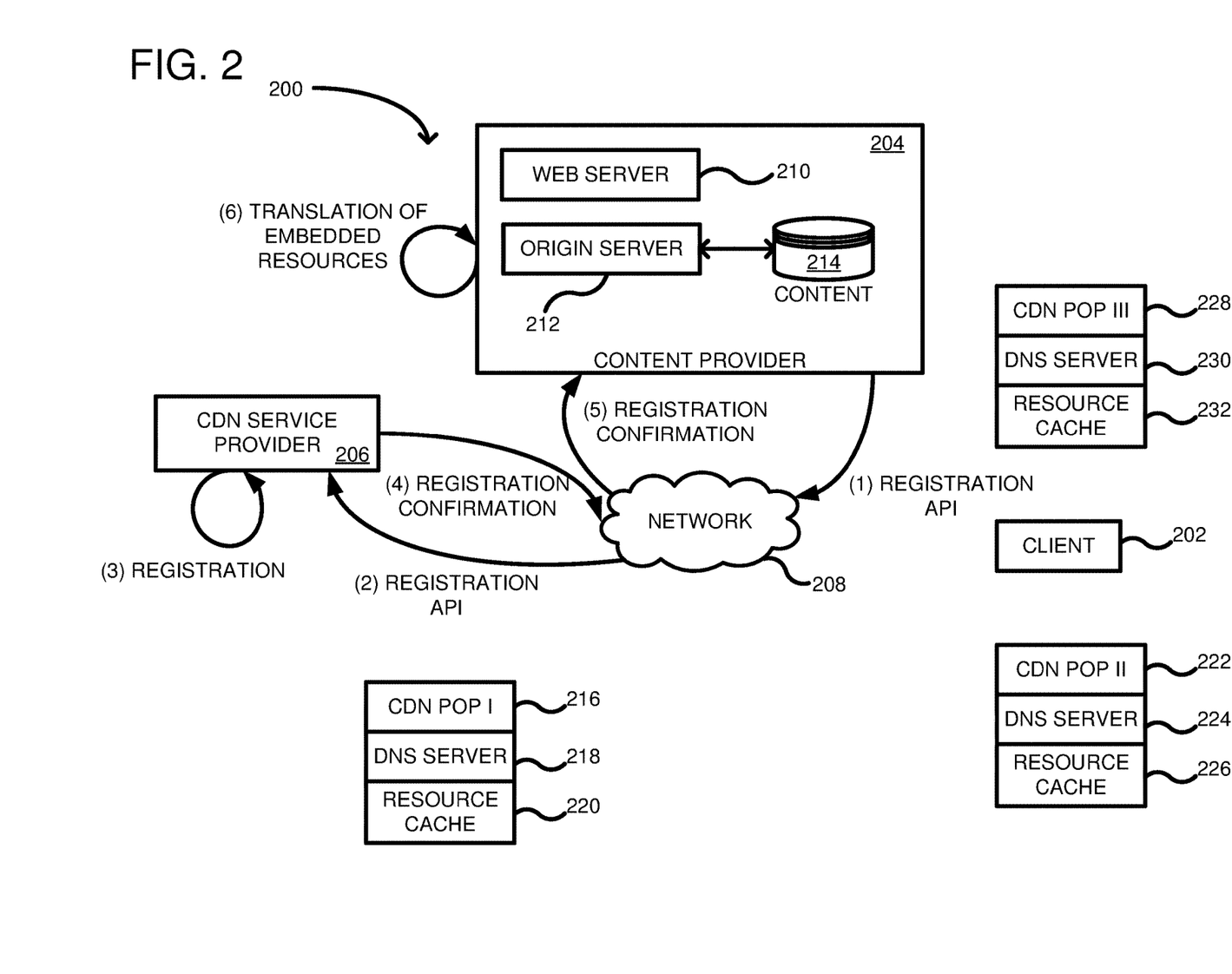
FIG. 2 is a block diagram of the CDN illustrating the registration of a content provider with a CDN service provider.
Figure 3:
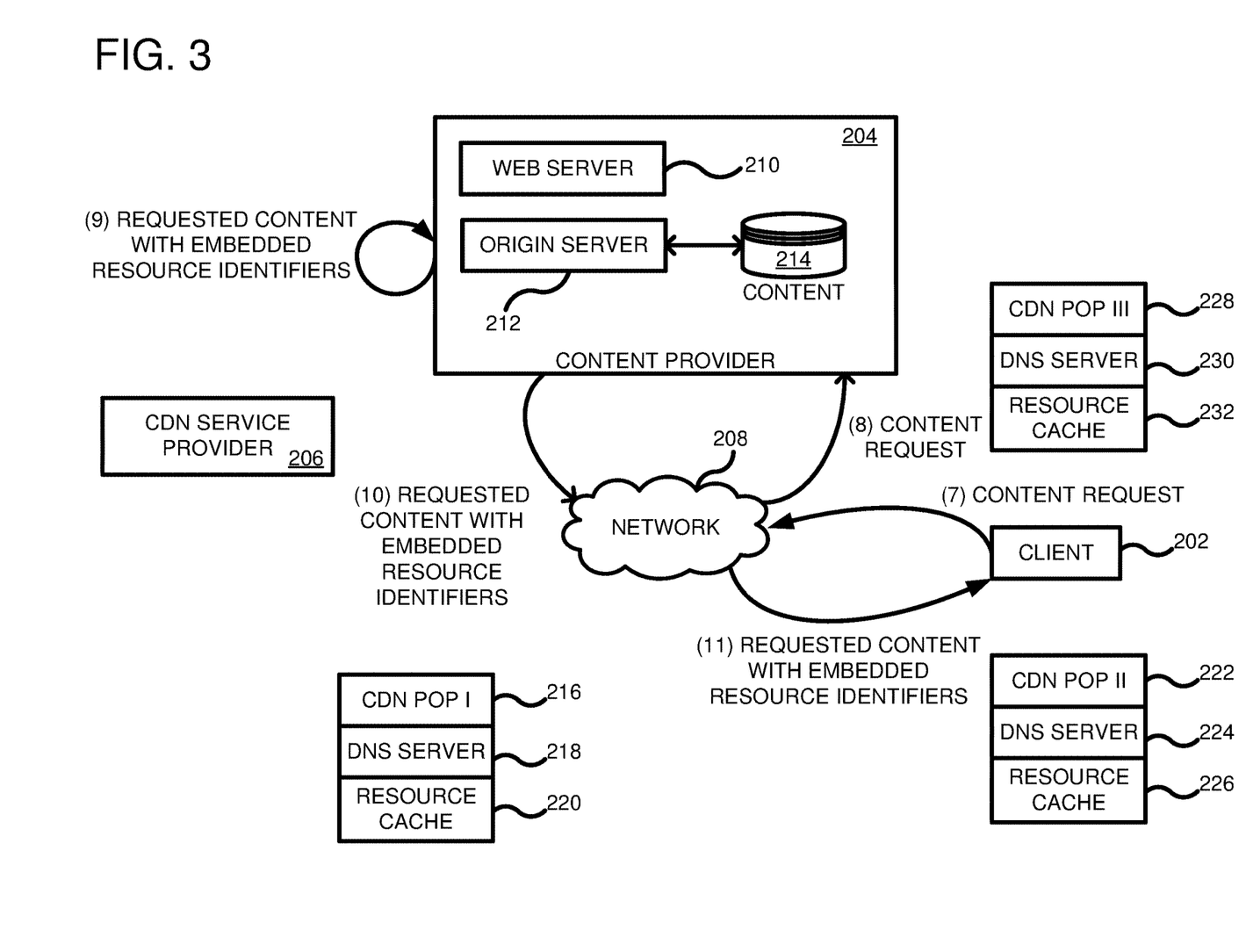
FIG. 3 is a block diagram of the CDN illustrating the generation and processing of a content request from a client computing device to a content provider.
Figure 4:
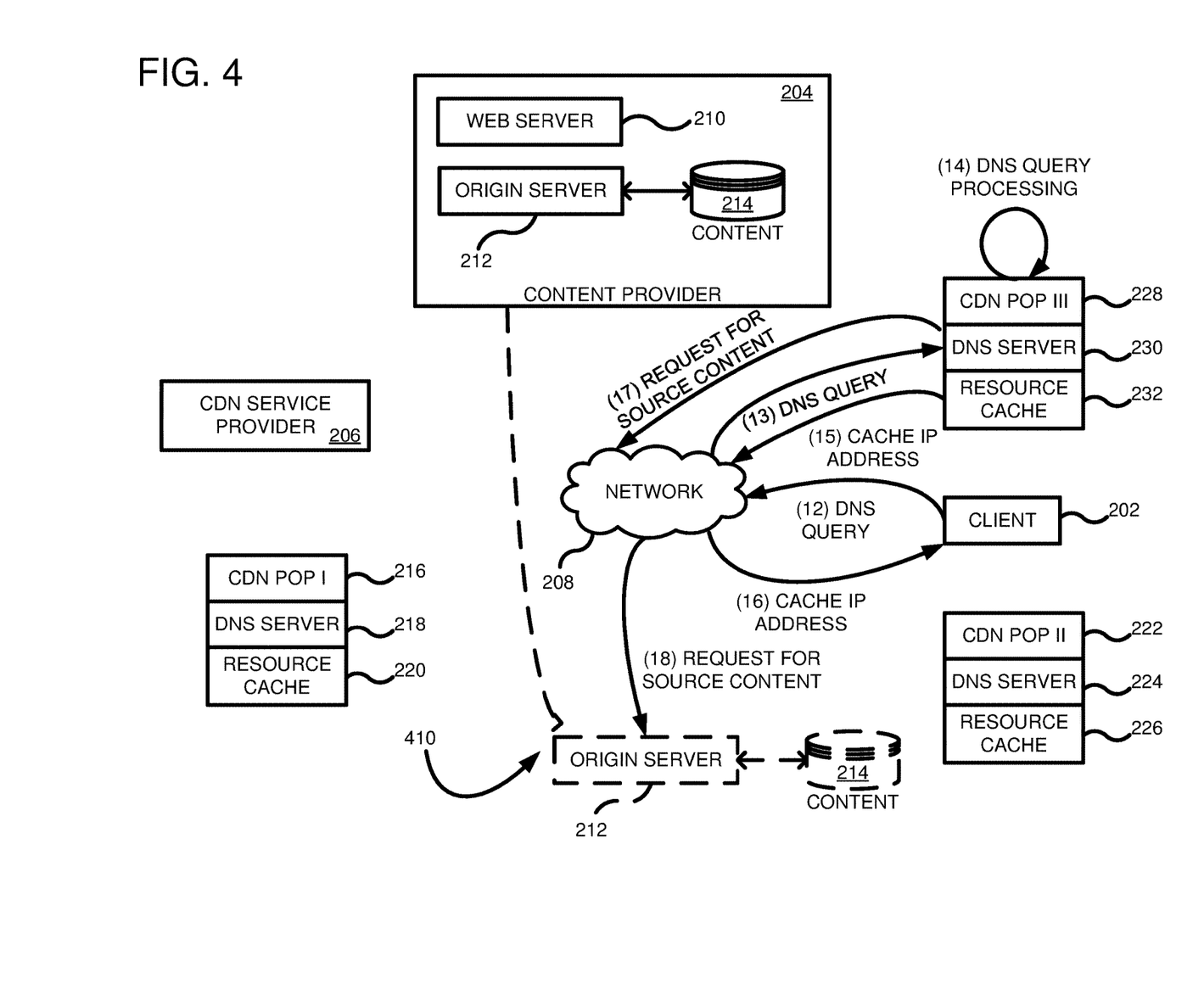
FIG. 4 is a block diagram of the CDN illustrating one embodiment of the generation and processing of a DNS query corresponding to an embedded resource from a client computing device to a CDN service provider.

FIGS. 2-4 show another embodiment of a CDN environment 200. For purposes of the example, however, the illustration has been simplified such that many of the components utilized to facilitate communications are not shown. One skilled in the relevant art will appreciate that such components can be utilized and that additional interactions would accordingly occur. FIG. 2 specifically shows a registration of a content provider 204 with the CDN service provider 206. As illustrated in FIG. 2, the CDN content registration process begins with registration of the content provider 204 with the CDN service provider 206. In an illustrative embodiment, the content provider 204 utilizes a registration application program interface ("API") (see (1)) to register with the CDN service provider 206 such that the CDN service provider 206 can provide content on behalf of the content provider 204. The registration API includes the identification of the origin server 212 of the content provider 204 that will provide requested resources to the CDN service provider 206. The registration API is sent to the CDN service provider (see (2)), which performs the registration (see (3). The registration confirmation is then returned to the content provider (see (4) and (5)).

One skilled in the relevant art will appreciate that upon identification of appropriate origin servers 212, the content provider 204 can begin to direct requests for content from client computing devices 202 to the CDN service provider 206. Specifically, in accordance with DNS routing principles, a client computing device request corresponding to a resource identifier would eventually be directed toward a POP 216, 222, 228 associated with the CDN service provider 206. In the event that the resource cache component 220, 226, 232 of a selected POP does not have a copy of a resource requested by a client computing device 202, the resource cache component will request the resource from the origin server 212 previously registered by the content provider 204. Each POP also includes a DNS server 218, 224, 230 for resolving DNS queries from client computing devices, such as device 202.

With continued reference to FIG. 2, upon receiving the registration API, the CDN service provider 206 obtains and processes the registration information. In an illustrative embodiment, the CDN service provider 206 can then generate additional information that will be used by the client computing devices 202 as part of the content requests. The additional information can include, without limitation, client identifiers, such as client identification codes, content provider identifiers, such as content provider identification codes, executable code for processing resource identifiers, such as script-based instructions, and the like. One skilled in the relevant art will appreciate that various types of additional information may be generated by the CDN service provider 206 and that the additional information may be embodied in any one of a variety of formats.

The CDN service provider 206 returns an identification of applicable domains for the CDN service provider (unless it has been previously provided) and any additional information to the content provider 204. In turn, the content provider 204 can then process the stored content with content provider specific information. In one example, as illustrated in FIG. 2, the content provider 204 translates resource identifiers (see (6)) originally directed toward a domain of the origin server 212 to a domain corresponding to the CDN service provider. The translated URLs are embedded into requested content in a manner such that DNS queries for the translated URLs will resolve to a DNS server corresponding to the CDN service provider 206 and not a DNS server corresponding to the content provider 204. Although the translation process is illustrated in FIG. 2, in some embodiments, the translation process may be omitted.

Generally, the identification of the resources originally directed to the content provider 204 will be in the form of a resource identifier that can be processed by the client computing device 202, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 204 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 206. In one embodiment, the translated URL identifies the domain of the CDN service provider 206 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional information.cdnprovider.com/path/resources.xxx

In another embodiment, the information associated with the CDN service provider 206 is included in the modified URL, such as through prepending or other techniques, such that the translated URL can maintain all of the information associated with the original URL. In this embodiment, the translated URL would have the form of:
http://additional information.cdnprovider.com/www.contentprovider.com/path/resource.xxx With reference now to FIG. 3, after completion of the registration and translation processes illustrated in FIG. 2, a client computing device 202 subsequently generates a content request (see (7) and (8)) that is received and processed by the content provider 204, such as through the Web server 210. In accordance with an illustrative embodiment, the request for content can be in accordance with common network protocols, such as the hypertext transfer protocol ("HTTP"). Upon receipt of the content request, the content provider 204 identifies the appropriate responsive content. In an illustrative embodiment, the requested content can correspond to a Web page that is displayed on the client computing device 202 via the processing of information, such as hypertext markup language ("HTML"), extensible markup language ("XML"), and the like. The requested content can also include a number of embedded resource identifiers, described above, that corresponds to resource objects that should be obtained by the client computing device 202 as part of the processing of the requested content (see (9), (10) and (11)). The embedded resource identifiers can be generally referred to as original resource identifiers or original URLs.

Upon receipt of the requested content, the client computing device 202, such as through a browser software application, begins processing any of the markup code included in the content and attempts to acquire the resources identified by the embedded resource identifiers. Accordingly, the first step in acquiring the content corresponds to the issuance, by the client computing device 202 (through its local DNS resolver), of a DNS query for the Original URL resource identifier that results in the identification of a DNS server authoritative to the "." and the "com" portions of the translated URL. After resolving the "." and "com" portions of the embedded URL, the client computing device 202 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

With reference now to FIG. 4, in an illustrative embodiment, the successful resolution of the "cdnprovider" portion of the original URL identifies a network address, such as an IP address, of a DNS server associated with the CDN service provider 206. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 202 to a shared IP address will arrive at a DNS server component logically having the shortest network topology distance, often referred to as network hops or CDN edge location, from the client computing device. The network topology distance does not necessarily correspond to geographic distance. However, in some embodiments, the network topology distance can be inferred to be the shortest network distance between a client computing device 202 and a POP.

With continued reference to FIG. 4, in either of the above identified embodiments (or any other embodiment), a specific DNS server in the DNS component 230 of a POP 228 receives the DNS query (see (12) and (13)) corresponding to the original URL from the client computing device 202. Once one of the DNS servers in the DNS component 230 receives the request, the specific DNS server attempts to resolve the request. In one illustrative embodiment as shown in FIG. 4, a specific DNS server resolves the DNS query by identifying an IP address of a cache server component that will process the request for the requested resource. A selected resource cache component can process (SEE (14)) the request by either providing the requested resource if it is available or attempt to obtain the requested resource from another source, such as a peer cache server computing device or the origin server 212 of the content provider 204 (see (15) and (16)).

In the specific example of FIG. 4, if the origin server 212 is migrated to a new location, as shown at 410, then an address of the location of the origin server can be changed from its' original address to a new address within the DNS tables of the DNS servers 218, 224 and 230. Thus, if the DNS server 230 needs to obtain content from the origin server 212, it will make such a request to the migrated origin server 212, shown at 410. Although not shown for simplicity, the origin server can then respond with the requested content. The CDN service provider 206 can receive the request for migration and perform the migration by determining a new server computer at the desired location and migrating the content and services associated with the server to the new location 410. In a specific example, if content is accessible through a proxy/load balancer in the previous origin, a new proxy/load balancer can be provisioned in the desired location. A reliable connection between the old and new origin can make the content migration seamless. Alternatively, a customer can populate the new origin with the content through uploads or other techniques. As a final step, the CDN service provider 206 can update the DNS servers 218, 224, 230 with the new address of the origin server so that any future requests are processed by the migrated server computer (see (17) and (18)).

In further reference to FIG. 4, the specific DNS server can utilize a variety of information in selecting a resource cache component. In an illustrative embodiment, the DNS server determines a class associated with the requesting client computing device. For example, the class can correspond to a specific geographic region to which the client computing device belongs or an internet service provider for the client computing device. Such class information can be determined from the client directly (such as information provided by the client computing device or ISP) or indirectly (such as inferred through a client computing device's IP address). Based on the class, the DNS server determines appropriate routing information. Then, for embodiments described specifically in reference to FIG. 4, the DNS server selects an appropriate resource cache component for providing content associated with the resource request based on the routing information for the determined class of the client computing device. The IP address selected by the DNS server may correspond to a specific caching server in the resource cache. Alternatively, the IP address can correspond to a hardware/software selection component (such as a load balancer). As will also be further described below, the DNS server can further utilize network performance measurements to assist in selecting specific resource cache components for the determined class.

Figure 5:
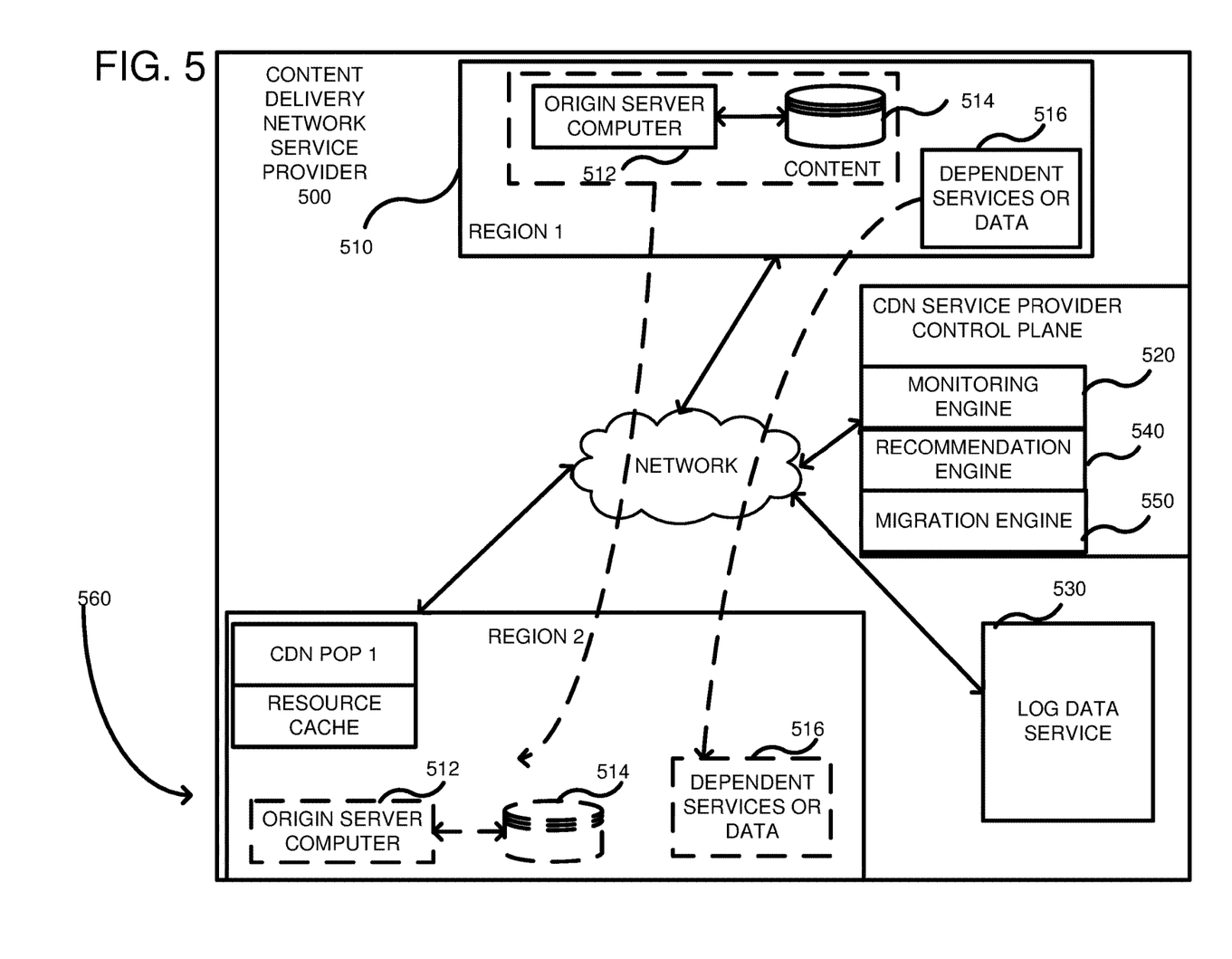
FIG. 5 is an example system diagram of a CDN wherein an origin server computer content is migrated together with its dependencies (services or data) from a first geographic region to a second geographic region.

FIG. 5 is another embodiment wherein a content delivery network 500 migrates an origin server computer, associated content, and dependent services or data. In particular, a content provider 510 in a geographic Region 1 (e.g., a first country) includes one or more host server computers 512 associated with content 514. In order to respond to requests from clients, the origin server computer 512 uses dependent services or data 516 located on other server computers associated with the content provider, the content delivery network service provider or other services available to the content provider. To migrate, the origin server computer 512, it may also migrate the dependent services or data 516. In such a case, a monitoring engine 520 transmits a request to a log data service 530 that includes access log data associated with requests to the CDN 500. A monitoring engine 520 receives log data and parses the log data to determine edge locations associated with requests to the origin server computer 512. The recommendation engine 540 can then use the log data to make recommendations to a customer of the CDN service provider 500 where to move the origin server computer 512. In response to a request to move the origin server computer 512, the migration engine 550 determines which services or data are associated with the origin server computer 512. Such dependency information can be provided by the CDN service provider 500. Alternatively, or, in addition, the customer can supply all or part of the dependency information. The migration engine 550 can then determine one or more server computers within region 2 to move the origin server computer 512, its associated content 514, and its dependent services or data 516. In this example, the new location for the origin server computer, the content and the dependent services or data is shown at 560. By migrating the origin server computer and its dependencies, the content provider can respond to requests using the origin server shown at 560 in region 2, just as it would have when located at region 1.

Figure 6:
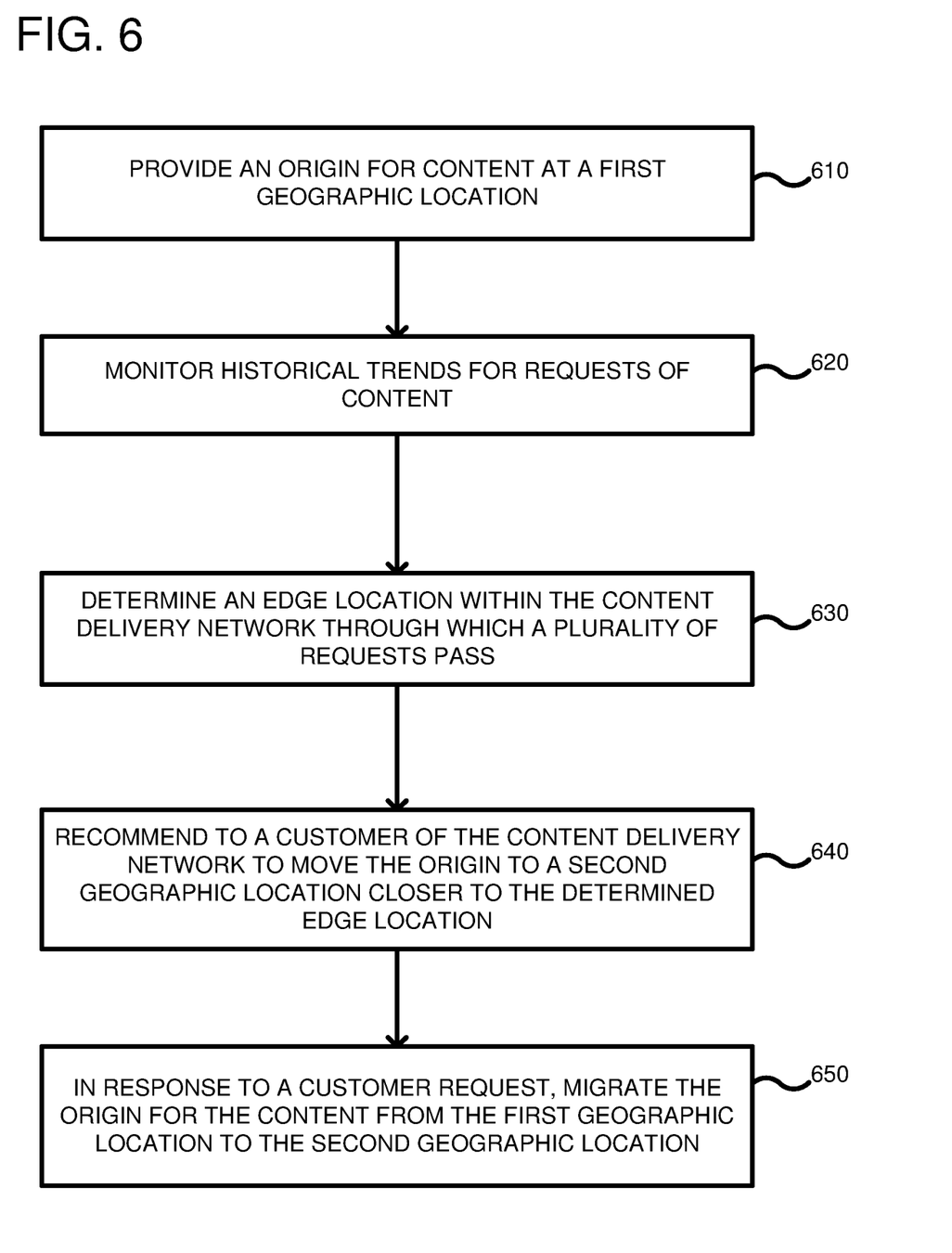
FIG. 6 is a flowchart of a method according to one embodiment for recommending and migrating an origin for content from a first geographic region to a second geographic region.

FIG. 6 is a flowchart of a method for delivering content in a CDN environment. In process block 610, an origin for content is provided at a first geographic location. The origin server includes the source content that can be used for all of the content that is available on the CDN. Thus, the source content is the genesis of data stored in cache at various edge servers in the CDN. When content has been in the cache for a certain amount of time, for example a time to live ("TTL"), or content in the cache otherwise expires, the edge servers (e.g., resource cache servers) go to the origin server to retrieve the content, which can include updated content. In process block 620, historical trends are monitored for requests for content. The historical trends can include which edge servers in edge locations received requests over a predetermined time period. Typically, services within the CDN service provider are used to store log data in accordance with requests to the CDN. The log data can include a source location of the request, the IP address, the edge server that the request landed on, and the RTT for the request. A determination can then be made using the historical trends, which edge server has the most requests (process block 630). The determination of which edge server has the most requests can be based on how many requests cause the edge server to retrieve content from the origin server, such as in a cache-miss scenario wherein the edge server is not currently storing the content being requested. Alternatively, the determination can be based on how many requests are for content that originates from the origin server, regardless of whether the edge server makes a request to the origin server (a cache miss) or whether the edge server is currently storing the content (a cache hit). In process block 640, a recommendation is made to a customer of the CDN service provider to move the origin from the first geographic location to a second geographic location closer, for example physically closer or closer in terms of latency, to the determined edge server location. In process block 650, in response to the customer request, the CDN service provider migrates the origin for the content from the first geographic location to the second geographic location. Thus, future requests for content from the origin are transmitted to the second geographic location.

Figure 7:
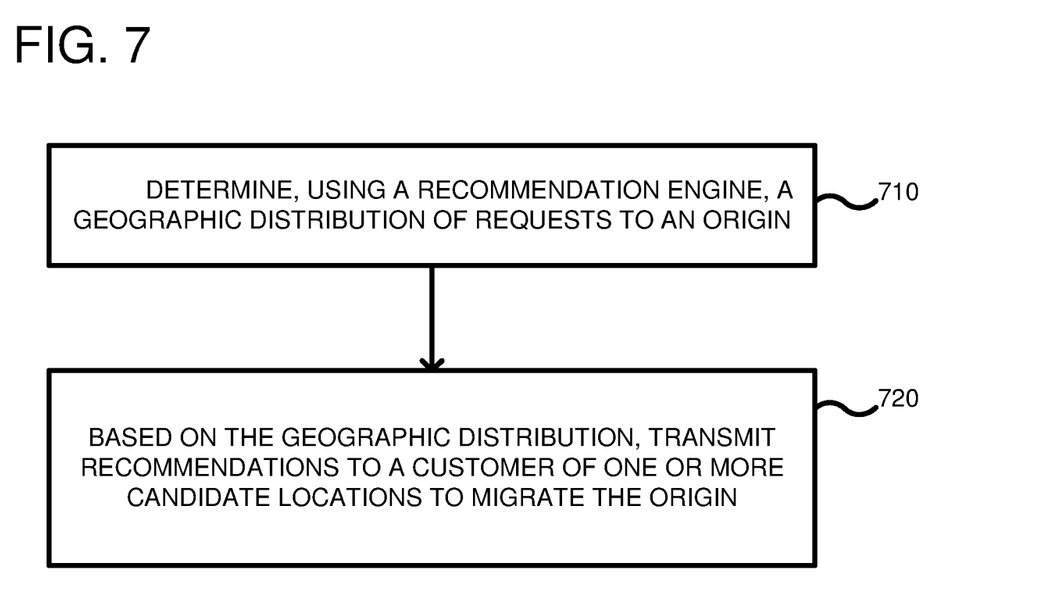
FIG. 7 is a flowchart of a method according to another embodiment for recommending one or more candidate locations to migrate an origin.

FIG. 7 is a flowchart of a method for delivering content in a CDN environment. In process block 710, a determination is made, using a recommendation engine, a geographic distribution of requests to an origin. For example, various edge servers can be monitored to obtain information about a number of requests that landed on different edge servers in different geographic regions. Other information can also be used, such as a cost analysis about which edge server is cheaper to run, which edge server is at capacity, or other statistics or network topology. In any event, the CDN can make intelligent decisions regarding where the origin can be relocated to provide optimal RTT. In process block 720, based on the geographic distribution, recommendations can be transmitted to a customer that show various candidate locations to which the origin can be migrated. Typically, the origin can then be migrated to a selected geographic region near a selected edge server. The original origin can then be used as back up or reconfigured for some other purpose. Thus, the original origin can be used for different functionality than prior to the migration.

Figure 8:
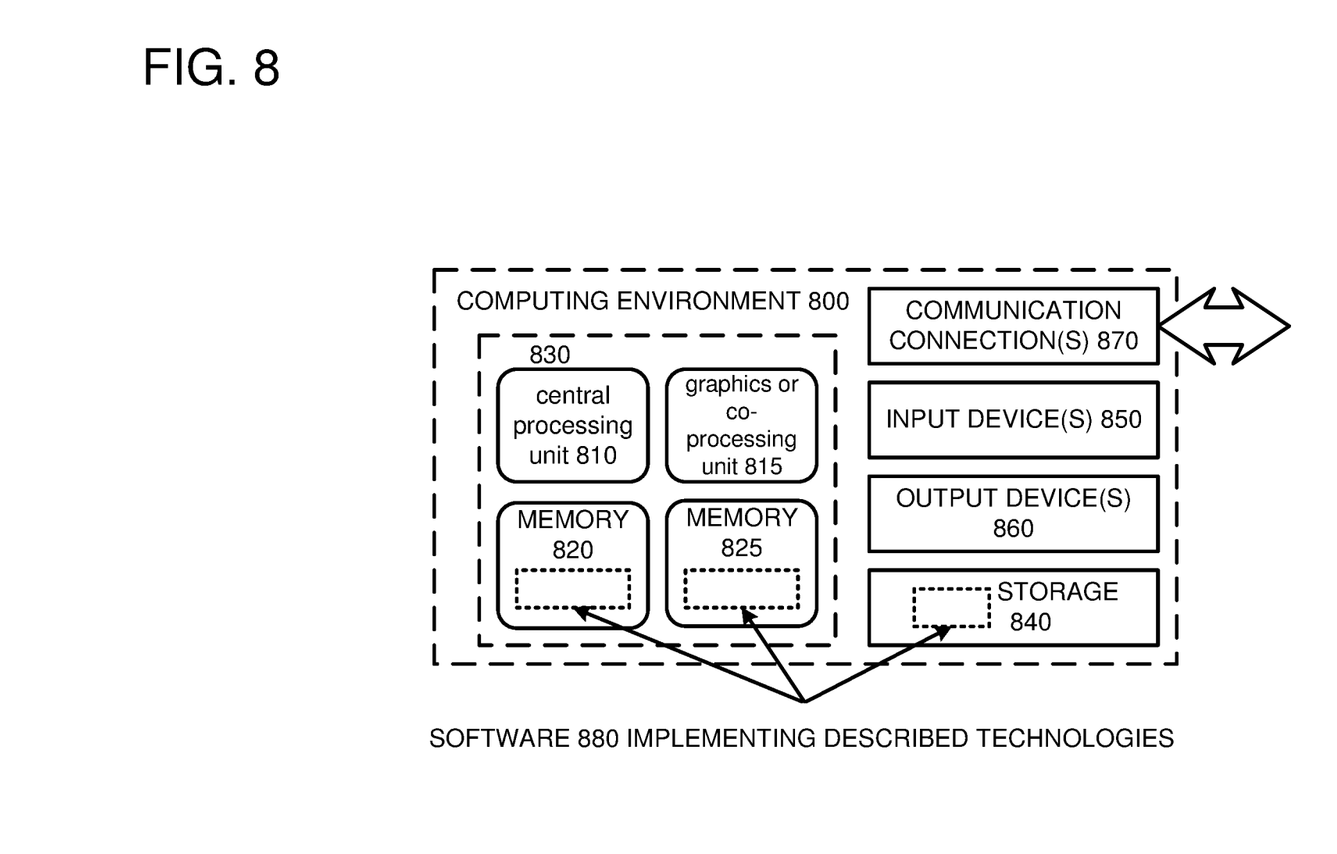
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the software can include instructions for implementing any of a monitoring engine, a recommendation engine, or a migration engine.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java®, Perl®, JavaScript®, Adobe Flash®, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of delivering content, the method comprising:
   providing an origin server for the content at a first geographic location in a content delivery network, the origin server comprising an origin of the content from which the content is cached at a plurality of edge server locations of the content delivery network;
   receiving first requests for the content at the content delivery network;
   monitoring historical trends for the first requests for the content;
   determining a geographic distribution of the first requests, wherein the geographic distribution of the first requests is associated with the edge server locations;
   determining a first edge server location of the plurality of edge server locations, within the content delivery network, through which a majority of the first requests pass, at least some of the first requests resulting in second requests from the first edge server location to the origin for the content;

based at least in part on the geographic distribution, recommending to a content providing customer of the content delivery network to move the origin to a second geographic location physically closer to the determined first edge server location; and in response to a third request from the content providing customer, migrating the origin for the content from the first geographic location to the second geographic location so as to reduce round-trip times for the second requests from the first edge server location to the origin;

wherein migrating the origin for the content comprises transferring content from the origin server at the first geographic location to another server at the second geographic location, and updating servers at the plurality of edge server locations with an address of the another server, so that future ones of the second requests are processed by the another server.

2. The method of claim 1, wherein the monitoring of the historical trends includes determining one or multiple edge locations through which a majority of the first requests pass.

3. The method of claim 1, wherein the migrating of the origin is for all of the content associated with the origin and further comprising, after the migrating, switching at least one host server computer that acted as a source of content at the first geographic location as a backup to the source of content at the second geographic location.

4. The method of claim 1, wherein the monitoring of the historical trends includes parsing logs associated with the first requests.

5. One or more non-transitory computer-readable storage media including instructions that upon execution cause one or more computer systems to perform operations comprising:

receiving first requests for content at the content delivery network, wherein an origin server for the content is present at a first geographic location in the content delivery network, the origin server comprising an origin of the content from which the content is cached at a plurality of edge server locations of the content delivery network;

monitoring historical trends for the first requests for the content;

determining a geographic distribution of the first requests, wherein the geographic distribution of the first requests is associated with the edge server locations;

determining a first edge server location of the plurality of edge server locations, within the content delivery network, through which a majority of the first requests pass, at least some of the first requests resulting in second requests from the first edge server location to the origin for the content;

based at least in part on the geographic distribution, recommending to a content providing customer of the content delivery network to move the origin to a second geographic location physically closer to the determined first edge server location; and in response to a third request from the content providing customer, migrating the origin for the content from the first geographic location to the second geographic location so as to reduce round-trip times for the second requests from the first edge server location to the origin;

wherein migrating the origin for the content comprises transferring content from the origin server at the first geographic location to another server at the second geographic location, and updating servers at the plurality of edge server locations with an address of the another server, so that future ones of the second requests are processed by the another server.

6. The one or more non-transitory computer-readable storage media of claim 5, wherein the migrating the origin from the first to the second geographic location includes copying content from the origin server at the first geographic location to the another server at the second geographic location and discontinuing the origin server at the first geographic location from receiving the second requests for the content.

7. The one or more non-transitory computer-readable storage media of claim 5, wherein, subsequent to the migrating, the another server at the second geographic location supplies content to be cached at the edge server locations in the content delivery network.

8. The one or more non-transitory computer-readable storage media of claim 5, wherein the instructions for determining the geographic distribution of the first requests include instructions to parse log files and to determine which of the edge server locations exceed a threshold number of the first requests or responses.

9. The one or more non-transitory computer-readable storage media of claim 5, further including instructions to determine dependencies associated with the origin of the content in order to satisfy the second requests, and further including instructions to migrate functionality of additional server computers associated with the dependencies to the second geographic location.

10. The one or more non-transitory computer-readable storage media of claim 5, wherein the determining the geographic distribution of the first requests includes instructions to determine historical trends for the first requests or responses over a predetermined period of time.

11. The one or more non-transitory computer-readable storage media of claim 5, further including instructions to change functionality of the origin server at the first geographic location as backup content for the another server at the second geographic location.

12. The one or more non-transitory computer-readable storage media of claim 5, further including instructions to transmit display data for displaying, on a client device, a plurality of candidate geographic locations, including the second geographic location, so that the content providing customer can select the second geographic location to migrate the origin.

13. The one or more non-transitory computer-readable storage media of claim 5, further including instructions to monitor the first or second requests and to store the first or second requests as log data.

14. The non-transitory computer-readable storage medium of claim 5, wherein the transmitting recommendations is further based on a time-series distribution of the requests.

15. A system comprising, one or more first host server computers adapted to store source content in original version, on one or more first non-transitory computer-readable storage media, in a content delivery network at a first geographic region;

a plurality of second host server computers distributed throughout different geographic regions in the content delivery network that function as caches for the source content on respective second computer-readable storage media; and a recommendation engine associated with the source content within the content delivery network, the recommendation engine for:

parsing logs to determine a geographical distribution of requests to the one or more first host server computers storing the source content in original version, and to select a second geographic region having a highest number of the requests to the one or more first host server computers storing the source content in original version; and transmitting recommendations for migration of the source content in original version to the second geographic region, based on the geographical distribution of the requests, wherein the second geographic region is separate from the first geographic region;

wherein the migration comprises provision of the source content at a third server in the second geographic region and redirection of requests from the second host server computers for origin content to the third server;

wherein the source content in original version at the second geographic region is positioned to have a reduced round-trip time to deliver the source content to edge locations associated with at least some of the caches, as compared to the first geographic region.

16. The system of claim 15, further including storage for storing access logs on one or more third computer-readable storage media, wherein the recommendation engine requests the access logs through Application Program Interface (API) requests.

17. The system of claim 15, further including a migration engine coupled to the recommendation engine for migrating the source content from the first geographic region to the second geographic region.

18. The system of claim 15, wherein the recommendation engine uses statistics and a network topology of the content distribution network to determine the second geographic region.

* * * * *